United States Patent [19]

Romanauskas

[11] Patent Number: 4,753,631
[45] Date of Patent: Jun. 28, 1988

[54] SPEED LIMITING ARRANGEMENT FOR A CENTRIFUGE ROTOR HAVING AN AXIAL MOUNTING BOLT

[75] Inventor: William A. Romanauskas, Southbury, Conn.

[73] Assignee: E. I. Du Pont de Nemours and Company, Wilmington, Del.

[21] Appl. No.: 926,179

[22] Filed: Nov. 3, 1986

[51] Int. Cl.⁴ .................. B04B 7/06; B04B 9/00
[52] U.S. Cl. ........................... 494/9; 494/12; 494/84
[58] Field of Search .............. 494/7, 9, 12, 82, 83, 494/84

[56] References Cited

U.S. PATENT DOCUMENTS

| | | | |
|---|---|---|---|
| 3,804,324 | 4/1974 | Sinn et al. | 494/84 X |
| 3,961,745 | 6/1976 | Wright | 494/12 X |
| 3,977,213 | 8/1976 | Spencer et al. | 464/32 X |
| 3,990,633 | 11/1976 | Stahl et al. | 494/84 |
| 4,101,070 | 7/1978 | Hoare et al. | 494/9 |
| 4,214,179 | 7/1980 | Jacobson et al. | 494/84 X |
| 4,412,830 | 11/1983 | Strain et al. | 494/12 |
| 4,568,325 | 2/1986 | Cheng et al. | 494/84 |

Primary Examiner—Stuart S. Levy
Assistant Examiner—Katherine Matecki

[57] ABSTRACT

A centrifuge rotor is characterized by a pair of magnetically attractive segments which are located between a clamping knob on an axially extending mounting bolt and the body of the rotor. The bolt holds the rotor to a drive spindle with a predetermined clamping force. As the rotor is rotated past a predetermined rotational speed the attractive force between the segments is overcome to cause the segments to displace apart thereby diminishing the magnitude of the clamping force holding the rotor in its connection to the drive spindle.

8 Claims, 3 Drawing Sheets

SPEED LIMITING ARRANGEMENT FOR A CENTRIFUGE ROTOR HAVING AN AXIAL MOUNTING BOLT

BACKGROUND OF THE INVENTION

The present invention relates to a centrifuge rotor having an axially extending mounting bolt to couple the rotor to its drive, and, in particular, to such a centrifuge rotor having an speed limiting arrangement thereon.

DESCRIPTION OF THE PRIOR ART

A centrifuge rotor is a relatively massive member adapted to expose a sample of a liquid to a centrifugal force field. To create the force field the rotor is rotated to a relatively high rotational speed.

All centrifuge instruments should be designed to contain all fragments resulting from the burst of any rotor designed to be used in that instrument. Rotor bursts can result from several causes: (1) manufacturing defects; (2) user abuse; (3) corrosion; (4) fatigue; or (5) failure of electronic speed limiting systems to limit the speed of the rotor to its maximum safe operating speed. In the first four causes listed rotor burst would occur at speeds at or below the maximum rated operating speed. In the case of the fifth cause the burst would occur at a speed substantially above the maximum rated operating speed.

To guard against such failure of the electronic speed limiting systems and the consequences thereof there are known mechanical arrangements whereby the rotor may be disconnected from its source of motive energy. Exemplary of such mechanisms are those disclosed in U.S. Pat. No. 3,990,633 (Stahl et al.), U.S. Pat. No. 4,568,325 (Cheng et al.) and U.S. Pat. No. 3,961,745 (Wright).

These devices relate to rotors that are mounted to the drive from the undersurface thereof. The first two patents utilize a mounting base or hub suitably attached to the rotor by an array of axially extending bolts. The base has a driving surface which matably engages with the drive spindle from the motive source. These elements form the driving interconnection between the rotor and its source. The base has reduced thickness web regions which are highly stressed as the rotor is operated. The base fractures in the highly stressed web regions if the rotor spins at too great a speed, thus disengaging the rotor from its drive. The last mentioned patent has a safety link handle at the upper surface of the rotor. The handle has a reduced thickness region designed to rupture at a predetermined speed to create an imbalance that causes the rotor to separate from the drive.

These devices have a shortcoming in common. As described their reliability depends upon accurately predicting fracture speed of cyclically loaded members, viz., the reduced thickness region. The fatigue damage resulting from cyclical loading would cause decoupling to take place at lower speeds for older rotors and at higher speeds for newer rotors. To guard against premature decoupling (before rotor design life is exceeded) it would be necessary to have a decoupling speed for new rotors higher than that needed if fatigue were not a factor. Even so, uncertainties associated with predicting fatigue failure would result in a certain amount of premature nuisance trips.

Accordingly, it would be advantageous to provide a mechanical arrangement for a rotor of the type having an axial mounting bolt that is responsive to rotor speed which is more finely sensitive to rotor speed than the prior art mechanisms and which will cause the rotor to disconnect from its driving engagement with the source of motive energy.

SUMMARY OF THE INVENTION

In accordance with the present invention, a centrifuge rotor of the type having an axially extending mounting bolt which is threadably engageable to the upper end of a drive spindle is provided with a segmented spacer element interposed between the undersurface of a clamping knob on the bolt and the body of the rotor. Engagement of the bolt to the drive spindle exerts a clamping force of a predetermined magnitude to hold the rotor to the drive spindle. The spacer element comprises a pair of segments secured together by a precisely controllable attractive force. In the preferred embodiment, the segments are magnetic and the attractive force is derived by magnetic attraction between the segments. As the rotor is rotated to increased speeds centrifugal force acts upon the segments. When the rotor reaches a predetermined speed the centrifugal force acting upon the segments overcomes the attractive force between the segments and causes the segments of the spacer to separate. This reduces the magnitude of the clamping force imposed on the rotor by the threaded mounting bolt and permits the rotor to remove itself from the drive member.

BRIEF DESCRIPTION OF THE DRAWINGS

The invention will be more fully understood from the following detailed description thereof taken in connection with the accompanying drawings which form a part of this application and in which.

DETAILED DESCRIPTION OF THE INVENTION

Figure 1:
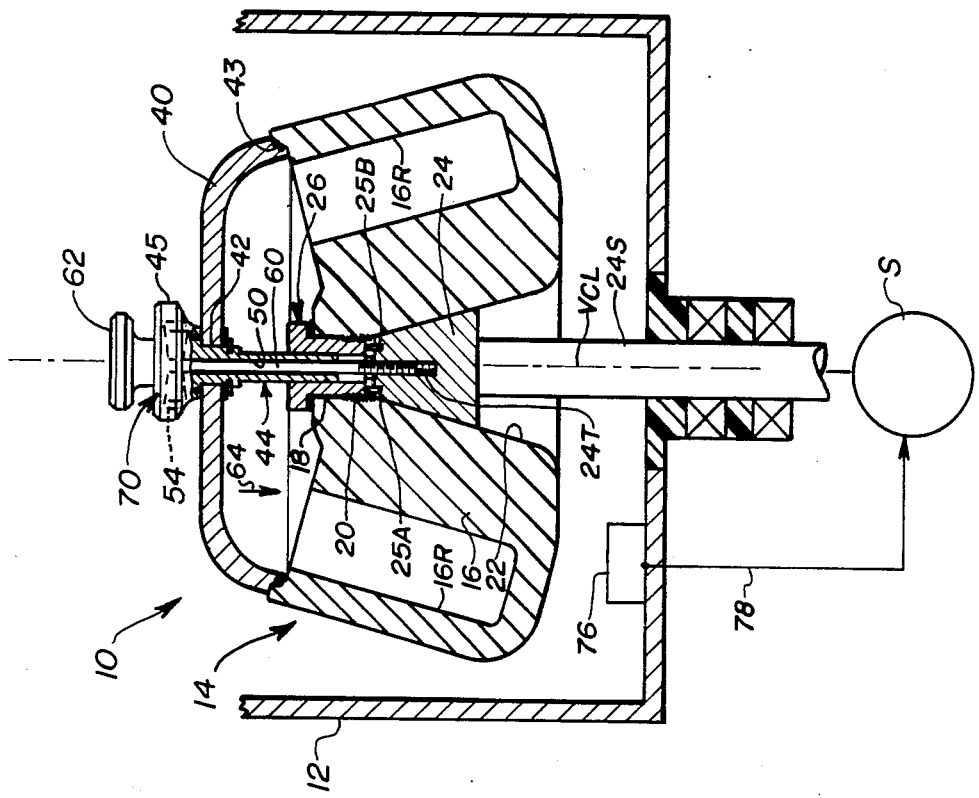
FIG. 1 is a stylized side elevational view of a centrifuge instrument with a rotor having a speed limiting arrangement in accordance with the present invention is therein.

Throughout the following detailed description, similar reference numerals refer to similar elements in all figures of the drawings.

With reference to FIG. 1, shown is a centrifuge instrument generally indicated by reference character 10 having a casing partially illustrated by reference character 12 in which a centrifuge rotor generally indicated by reference character 14 may be received. The rotor 14 includes a body member 16 having an array of sample receiving recesses 16R therein which are inclined at a predetermined fixed angle (including vertical) with respect to the vertical axis of rotation VCL of the rotor. Although the rotor 14 is shown as being of the fixed angle type, it should be understood that a swinging bucket type centrifuge rotor may also be used and remain within the contemplation of the present invention.

The rotor body member 16 has a central bore 18 extending therethrough. A portion of the cylindrical bore 18 is threaded, as at 20. The lower portion of the cylindrical bore 18 communicates with a frustoconically shaped enlarged region 22. The enlarged region 22 receives the upper frustoconically shaped end of a drive spindle 24. The end of the spindle 24 has a threaded opening 24T provided therein for a purpose to be described.

The drive spindle 24 has drive pins 25A, 25B projecting upwardly from the upper surface thereof. As seen best in FIG. 2 a rotor mounting adaptor 26 having external threads 28 thereon is threadedly secured into the bore 18 along the threads 20 thereof. The adapter 26 has an internal bore 30 that is threaded over a portion 32 of its length. The upper end of the adapter 26 overlies a portion of the rotor body, capturing a washer 33 therebetween. The lower axial end of the adaptor 26 is grooved as at 34. A pair of drive pins 35A and 35B are carried by the adaptor 26 and project downwardly into the groove 34. The drive pins 25A, 25B on the upper end of the drive spindle 24 project into the groove 34 in the adaptor 26, although in the Figures the upper end of the spindle 24 is shown as being spaced from its interengaged position with respect to the adapter 26 for clarity of illustration. The spindle 24 is connected via a shaft portion 24S to a source S of motive energy such that rotation of the drive spindle 24 causes the drive pins 25A, 25B thereon to circumferentially abut with the depending drive pins 35A, 35B on the adaptor 26 whereby motive energy may be transmitted from the source S into the rotor 14 to cause the rotation of the same about the axis of rotation VCL.

A dome-like cover 40 (FIG. 1) having a central aperture 42 therein and a peripheral gasket 43 is disposed over the body 16 of the rotor 14. An elongated axially extending stud 44 having an enlarged head 45 is rotatably captured in the aperture 42 of the cover 40 by a washer 46 and a lock ring 47 that is accepted in a groove 48 in the stud 44. A gasket 49 is provided in the undersurface of the head 45 to seal the aperture 42.

A central axial bore 50 extends through the stud 44, with the upper end of the bore 50 being enlarged to define a chamber 54 provided for a purpose to be set forth herein. The upper end of the chamber 54 is partially closed by a washer 55 that is secured in position by a lock ring 56. The interior of the chamber 54 is beveled, as at 57, for a purpose to be explained.

The lower end of the stud 44 is externally threaded, as at 58, with the threaded engagement between the external threads 58 on the stud 44 and the internal threads 32 on the mounting adapter 26 serving to interconnect the cover 40 to the body 16 of the rotor 14. When so engaged the stud 44 effectively becomes part of the body 16 of the rotor 14 and can be so construed for present purposes.

The rotor 14 is secured into position on the drive spindle 24 by an axially extending threaded mounting bolt 60 having a knob 62 at one end thereof. The mounting bolt 60 extends downwardly through the central axial bore 50 in the stud 44 and is received into the threaded opening 24T provided at the upper surface of the drive spindle 24. Threading of the bolt 60 into the spindle 24 imposes a clamping force acting in the direction of the arrow 64 on the rotor 14 holding the same securely in a driven engagement with the drive spindle 24.

Figure 2:
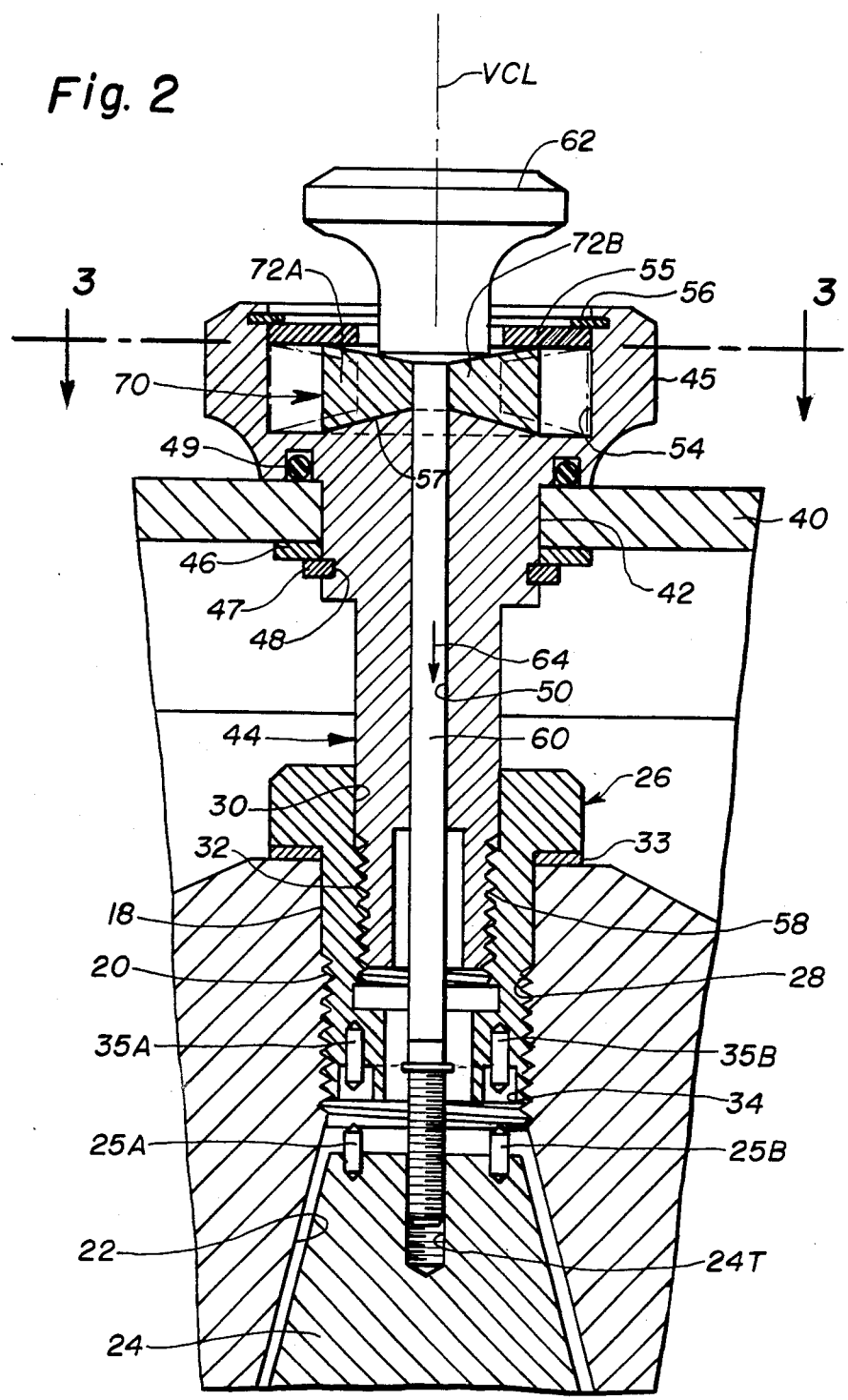
FIG. 2 is an enlarged side elevational view entirely in section of a portion of the rotor of FIG. 1 illustrating the mounting arrangement securing the rotor to its drive and the relationship of the speed limiting arrangement with respect thereto.

As best seen in FIG. 2, in accordance with the present invention, a spacer generally indicated by the reference character 70 comprising a pair of complementary segments 72A, 72B is received within the enlarged chamber 54 in the stud 44. Since the stud 44 when engaged to the adapter 26 is part of the rotor body 16, the chamber of 54 may be construed as being provided in the body of the rotor for present purposes. The spacer segments 72 are disposed intermediate the underside of the knob 62 and the beveled surface 57 of the chamber 54. At least the undersurface of segments 72A, 72B are beveled to conform to the bevel of the chamber 54.

The segments 72A, 72B are secured together with a predetermined attractive force. In the preferred embodiment the segments 72A, 72B are magnetic and the attractive force is provided by the mutual magnetic attraction between the segments 72A, 72B. Any alternate method of releasably joining segments 72A, 72B of the spacer with a substantially known predetermined force of attraction lies within the contemplation of this invention.

Figure 3:
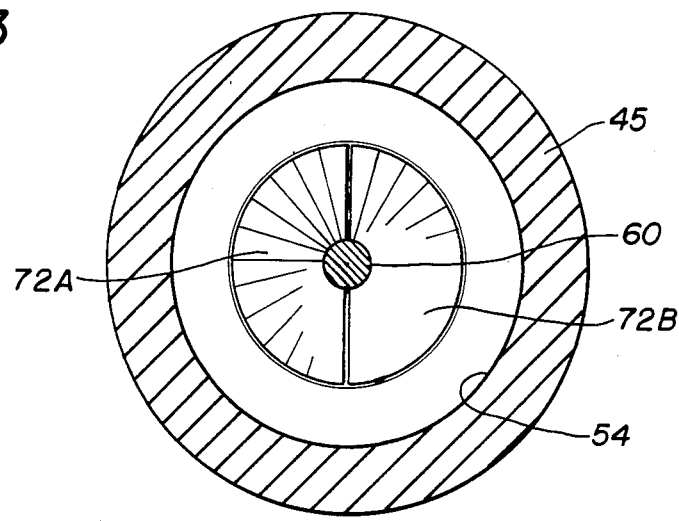
FIGS. 3 and 4 are views taken along view lines 3—3 and 4—4 of FIG. 2 respectively illustrating the segments of the spacer assembly in the first and second positions.
Figure 4:
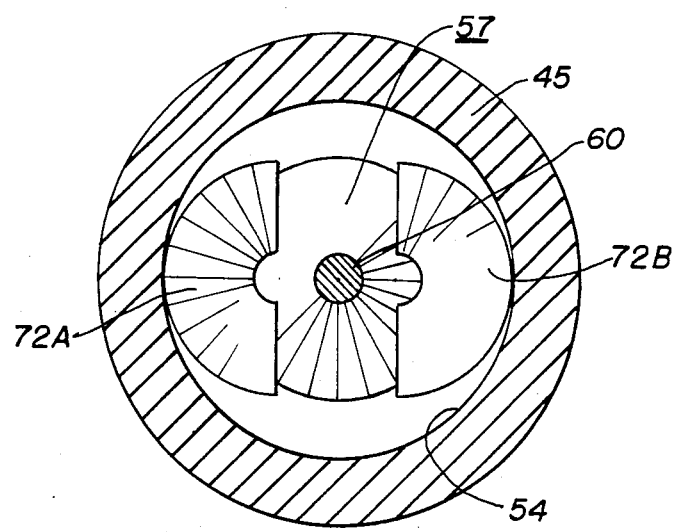

In operation the spacer segments 72A, 72B are interposed in the above described assembled relationship and at the location within the chamber 54 intermediate the underside of the knob 62 and the body 16 of the rotor 14 as embodied by the stud 44 secured thereto. With the segments 72A, 72B of the spacer 70 in their initial position, as also seen in FIG. 3, (in which the segments abut in engaged relation) the threading of the bolt 60 into the spindle 24 exerts a clamping force of a predetermined magnitude acting in the direction 64 to hold the rotor 14 to the spindle 24. As the rotor 14 is spun centrifugal force acts on the segments 72A, 72B of the spacer 70. When the rotor exceeds a predetermined rotational speed the magnitude of the centrifugal force acting on the segments 72A, 72B overcomes the attractive force therebetween causes them to separate and move outwardly within the chamber 54 to their second position also seen in FIG. 4. The interaction of the bevelled cam surfaces of the chamber 54 and on the segments minimize frictional forces tending to retard or impede the displacement of the segments 72A, 72B from their first, joined, position (FIG. 3) to their second, spaced, position (FIG. 4). The magnetic attraction force between the segments 72A, 72B is selected whereby the first predetermined rotor speed (slightly above the normal operating speed) may be precisely controlled.

As the segments 72A, 72B move away from each other beneath the knob 62 of the mounting bolt 60 the magnitude of the clamping force holding the rotor 14 to the drive spindle 24 is decreased. The rotor 14 is therefore permitted to move off the drive spindle 24. This condition imbalances the rotor 14. Increased rotor speed would result in increased imbalance, causing the rotor 18 to walk off the conical end of the spindle 24. If the centrifuge 10 is provided with an imbalance detector 76, the detector 76 would respond to the imbalance condition to provide a suitable signal on a line 78 the source S to interrupt motive energy to the rotor 14.

Those skilled in the art having benefit of the teachings of the present invention as hereinabove set forth may effect numerous modifications thereto. For example, the chamber 54 may be located elsewhere in the rotor 14. Moreover, more than two segments may be used. Although shown as circular, the segments need not be so configured. It should also be understood that the segments need not be totally engaged with each other when they occupy the first position so long as they remain in their initial position to maintain the clamping force holding the rotor to the spindle at some initial level. Other techniques may be used to provide the attractive force between the segments. For example, adhesives or some form of spring bias may be used. The magnetic attraction between the segments is preferred because it permits the segments to automatically reset themselves. These and other modifications are to be construed as lying within the scope of the present invention as defined in the appended claims.

What is claimed is:

1. In a centrifuge rotor rotatable about an axis of rotation, the rotor being of the type having a body portion with a central axial bore that receives a mounting bolt which is engageable into a drive spindle thereby to connect the rotor to a source of motive energy, the mounting bolt having an enlarged clamping knob at the upper end thereof, the improvement comprising:

a chamber disposed in the body of the rotor;

a pair of spacer segments disposed in the chamber between the clamping knob and the body of the rotor, the segments being responsive to centrifugal force to displace from a first position to a second position, in the first position the segments are located between the knob and the rotor body and cooperate therewith to clamp the rotor with a predetermined clamping force into engagement with the spindle, while in the second position the segments are spaced from their initial positions to diminish the magnitude of the clamping force; and means for securing the segments together in the first position with a predetermined attractive force, the means being responsive to centrifugal force as the rotor is rotated to a predetermined speed to release the segments and to permit them to displace to the second position.

2. The rotor of claim 1 wherein the chamber has a surface therein and the segments each have an undersurface thereon and wherein the undersurface of the segments and the surface of the chamber on which the segments are received are bevelled to define abutting cam surfaces therebetween.

3. The rotor of claim 2 wherein the segments are magnetized and wherein the holding force is derived from the forces of magnetic attraction between the segments.

4. The rotor of claim 1 wherein the segments are magnetized and wherein the holding force is derived from the forces of magnetic attraction between the segments.

5. The rotor of claim 4 wherein, in the first position, the segments are in engaged relation with each other.

6. The rotor of claim 3 wherein, in the first position, the segments are in engaged relation with each other.

7. The rotor of claim 2 wherein, in the first position, the segments are in engaged relation with each other.

8. The rotor of claim 1 wherein, in the first position, the segments are in engaged relation with each other.

* * * * *